United States Patent
Shimoshimano et al.

(10) Patent No.: US 10,856,304 B2
(45) Date of Patent: Dec. 1, 2020

(54) BASE STATION APPARATUS, CONTROL APPARATUS, AND STORAGE MEDIUM FOR TRANSMITTING DATA

(71) Applicant: JVC KENWOOD Corporation, Yokohama (JP)

(72) Inventors: Hideo Shimoshimano, Yokohama (JP); Ichiro Shishido, Yokohama (JP)

(73) Assignee: JVC KENWOOD CORPORATION, Yokohama (JP)

(*) Notice: Subject to any disclaimer, the term of this patent is extended or adjusted under 35 U.S.C. 154(b) by 11 days.

(21) Appl. No.: 16/261,615

(22) Filed: Jan. 30, 2019

(65) Prior Publication Data

US 2019/0239236 A1    Aug. 1, 2019

(30) Foreign Application Priority Data

Jan. 30, 2018  (JP) ................ 2018-013987

(51) Int. Cl.
*H04W 72/08* (2009.01)
*H04W 28/02* (2009.01)
*H04B 17/318* (2015.01)
*H04W 72/04* (2009.01)
*H04B 17/309* (2015.01)
*H04B 17/382* (2015.01)

(52) U.S. Cl.
CPC ........ *H04W 72/085* (2013.01); *H04B 17/309* (2015.01); *H04B 17/318* (2015.01); *H04B 17/382* (2015.01); *H04W 28/0205* (2013.01); *H04W 72/0413* (2013.01); *H04W 72/0426* (2013.01)

(58) Field of Classification Search
None
See application file for complete search history.

(56) References Cited

U.S. PATENT DOCUMENTS

| | | | |
|---|---|---|---|
| 2012/0322486 A1* | 12/2012 | Kameno | H04W 28/16 455/509 |
| 2018/0007700 A1* | 1/2018 | Fudaba | H04W 52/04 |

FOREIGN PATENT DOCUMENTS

JP    2002-335582 A    11/2002

* cited by examiner

*Primary Examiner* — Saumit Shah
(74) *Attorney, Agent, or Firm* — Brundidge & Stanger, P.C.

(57) ABSTRACT

A quality score calculator calculates first quality information indicating a degree of quality of a signal received from a terminal apparatus. A communication interface acquires second quality information indicating a degree of quality of a signal received by another base station apparatus from the terminal apparatus. A controller compares the first quality information calculated and the second quality information acquired and determines which indicates a higher quality. A communication interface and a wireless transmitter transmit the signal received from the terminal apparatus when it is determined that the quality of the first quality information is higher.

6 Claims, 22 Drawing Sheets

FIG.6

| BASE STATION APPARATUS IP ADDRESS | 172.16.0.1 |
|---|---|
| SUBNET MASK | 255.255.255.0 |
| GATEWAY ADDRESS | 172.16.0.254 |
| QUALITY SCORE PACKET TRANSMISSION AND RECEPTION MULTICAST ADDRESS PORT NUMBER | 239.192.0.1 10000 |
| CALL INFORMATION PACKET SIGNAL TRANSMISSION AND RECEPTION MULTICAST ADDRESS PORT NUMBER | 239.192.0.2 20000 |

| No | CALL INFORMATION RECEPTION TIME | DATA AREA |
|---|---|---|
| 01 | 10:10:32:002 | CALL INFORMATION DATA |
| 02 | 10:10:32:102 | CALL INFORMATION DATA |
| 03 | 10:10:32:203 | CALL INFORMATION DATA |
| 04 | 10:10:32:302 | CALL INFORMATION DATA |
| 05 | 10:10:32:401 | CALL INFORMATION DATA |

| CALL INFORMATION RECEPTION TIME | QUALITY SCORE |
|---|---|

| No | PACKET RECEPTION TIME | TRANSMITTING BASE STATION APPARATUS ADDRESS | CALL INFORMATION RECEPTION TIME | QUALITY SCORE |
|---|---|---|---|---|
| 01 | 10:10:32:013 | 172.16.0.1 | 10:10:32:002 | 65 |
| 02 | 10:10:32:014 | 172.16.0.3 | 10:10:32:003 | 90 |
| 03 | 10:10:32:016 | 172.16.0.4 | 10:10:32:002 | 75 |
| 04 | 10:10:32:017 | 172.16.0.2 | 10:10:32:003 | 60 |
| 05 | 10:10:32:112 | 172.16.0.1 | 10:10:32:103 | 65 |
| 06 | 10:10:32:113 | 172.16.0.2 | 10:10:32:102 | 61 |
| 07 | 10:10:32:113 | 172.16.0.4 | 10:10:32:103 | 76 |
| 08 | 10:10:32:114 | 172.16.0.3 | 10:10:32:102 | 91 |
| . . . . . . . . . . . . . . . . | | | | |

| No | TRANSMISSION TIME | DATA AREA |
|---|---|---|
| 01 | 10:10:32:102 | CALL INFORMATION DATA |
| 02 | 10:10:32:203 | CALL INFORMATION DATA |
| 03 | 10:10:32:303 | CALL INFORMATION DATA |
| 04 | 10:10:32:402 | CALL INFORMATION DATA |
| 05 | 10:10:32:501 | CALL INFORMATION DATA |

| No | PACKET RECEPTION TIME | TRANSMITTING BASE STATION APPARATUS IP ADDRESS | CALL INFORMATION RECEPTION TIME | QUALITY SCORE |
|---|---|---|---|---|
| 01 | 10:10:32:013 | 172.16.0.1 | 10:10:32:002 | 90 |
| 02 | 10:10:32:014 | 172.16.0.3 | 10:10:32:003 | 65 |
| 03 | 10:10:32:016 | 172.16.0.4 | 10:10:32:002 | 75 |
| 04 | 10:10:32:017 | 172.16.0.2 | 10:10:32:003 | 55 |
| . . . . . . . . . . . . . . . | | | | |

| No | PACKET RECEPTION TIME | TRANSMITTING BASE STATION APPARATUS IP ADDRESS | CALL INFORMATION RECEPTION TIME | QUALITY SCORE |
|---|---|---|---|---|
| 01 | 10:10:32:014 | 172.16.0.3 | 10:10:32:003 | 65 |
| 02 | 10:10:32:016 | 172.16.0.4 | 10:10:32:002 | 75 |
| 03 | 10:10:32:017 | 172.16.0.2 | 10:10:32:003 | 55 |
| . . . . . . . . . . . . . . . | | | | |

| BASE STATION APPARATUS IP ADDRESS | 172.16.0.1 |
|---|---|
| SUBNET MASK | 255.255.255.0 |
| GATEWAY ADDRESS | 172.16.0.254 |
| CONTROL APPARATUS IP ADDRESS | 172.6.0.200 |
| CALL INFORMATION PACKET SIGNAL TRANSMISSION AND RECEPTION MULTICAST ADDRESS PORT NUMBER | 239.192.0.2 20000 |

| TRANSMISSION TIME | CALL INFORMATION RECEPTION TIME |
|---|---|

42

BASE STATION APPARATUS, CONTROL APPARATUS, AND STORAGE MEDIUM FOR TRANSMITTING DATA

CROSS-REFERENCE TO RELATED APPLICATION

This application is based upon and claims the benefit of priority from the prior Japanese Patent Application No. 2018-13987, filed on Jan. 30, 2018, the entire contents of which is incorporated herein by reference.

BACKGROUND

1. Field

The present invention relates to communication technologies and, more particularly, a base station apparatus, control apparatus, and recording medium for transmitting data.

2. Description of the Related Art

In a mobile communication system, all base station apparatuses in the system may be operated by using a common frequency. When a packet signal transmitted from one terminal apparatus is received by a plurality of base station apparatuses, the upstream control station connected to the base station apparatuses selects a packet with a high quality from the packet signals transmitted from the plurality of base station apparatuses and transfers the selected packet to the network (e.g., patent document 1).
[patent document 1] JP2002-335582

According to the technology disclosed in patent document 1, packet signals sent by mobile station apparatuses are transmitted from a plurality of base station apparatuses to the control station. Therefore, the traffic over the network may be increased due to these packet signals.

SUMMARY

A base station apparatus according to an embodiment includes: a calculator that calculates first quality information indicating a degree of quality of a signal received from a terminal apparatus; an acquisition interface that acquires second quality information indicating a degree of quality of a signal received by another base station apparatus from the terminal apparatus; a determination interface that compares the first quality information calculated by the calculator and the second quality information acquired by the acquisition interface and determines which indicates a higher quality; and a transmitter that transmits the signal received from the terminal apparatus when it is determined by the determination interface that the quality of the first quality information is higher.

Another embodiment relates to a control apparatus. A control apparatus comprising: an acquisition interface that acquires, from a plurality of base station apparatuses, an identifier that identifies each base station apparatus and quality information indicating a degree of quality of a signal received by each base station apparatus from a terminal apparatus; a selection interface that selects the quality information indicating the highest quality from among the quality information acquired by the acquisition interface; and an output interface that outputs an instruction to direct the base station apparatus having an identifier corresponding to the quality information selected by the selection interface to transmit a signal corresponding to the quality information.

Optional combinations of the aforementioned constituting elements, and implementations of the embodiments in the form of methods, apparatuses, systems, recording mediums, and computer programs may also be practiced as additional modes of the embodiments.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 6 shows a data structure of data stored in the IP address setting interface of FIG. 5;

FIG. 7 shows a data structure of data stored in the call information reception buffer of FIG. 5;

FIG. 8 shows a data structure of a quality score packet signal transmitted from the communication interface of FIG. 5;

FIG. 10 shows a data structure of data stored in the quality score reception buffer of FIG. 5;

FIG. 14 shows a data structure of data stored in the call information transmission buffer of FIG. 5;

FIGS. 16A-16B show exemplary data stored in the quality score reception buffer when the failure to deliver a quality score packet signal occurs;

FIG. 19 shows a data structure of data stored in the IP address setting interface of the control apparatus of FIG. 17;

FIG. 22 shows a data structure of a call information delivery instruction packet signal transmitted from the control apparatus 12.

DETAILED DESCRIPTION

The invention will now be described by reference to the preferred embodiments. This does not intend to limit the scope of the present invention, but to exemplify the invention.

Embodiment 1

An embodiment of the present invention relates to a communication system including a plurality of terminal apparatuses configured to communicate with each other via a base station apparatus. For example, the communication system is compatible with the business wireless system. The frequency of an uplink from a terminal apparatus to a base station apparatus (hereinafter, "uplink frequency") and the frequency of a downlink from a base station apparatus to a terminal apparatus (hereinafter, "downlink frequency") are different. The uplink frequency corresponds to the reception frequency in the base station apparatus, and the downlink frequency corresponds to the transmission frequency in the base station apparatus. Meanwhile, the uplink frequencies in a plurality of base station apparatuses are identical, and so are the downlink frequencies in the plurality of base station apparatuses. Hereinafter, a combination one uplink frequency and one downlink frequency may be referred to as "channel", but only one of the uplink frequency and the downlink frequency may also be referred to as "channel". Not only "channels" defined by frequencies but also "channels" defined by using technologies like time-division multiplexing and spread codes may be used. "Channels" can be said to be "wireless resources" used in a wireless communication system. Hereinafter, a comparative communication system will first be described before describing the communication system according to the embodiment.

Figure 1:
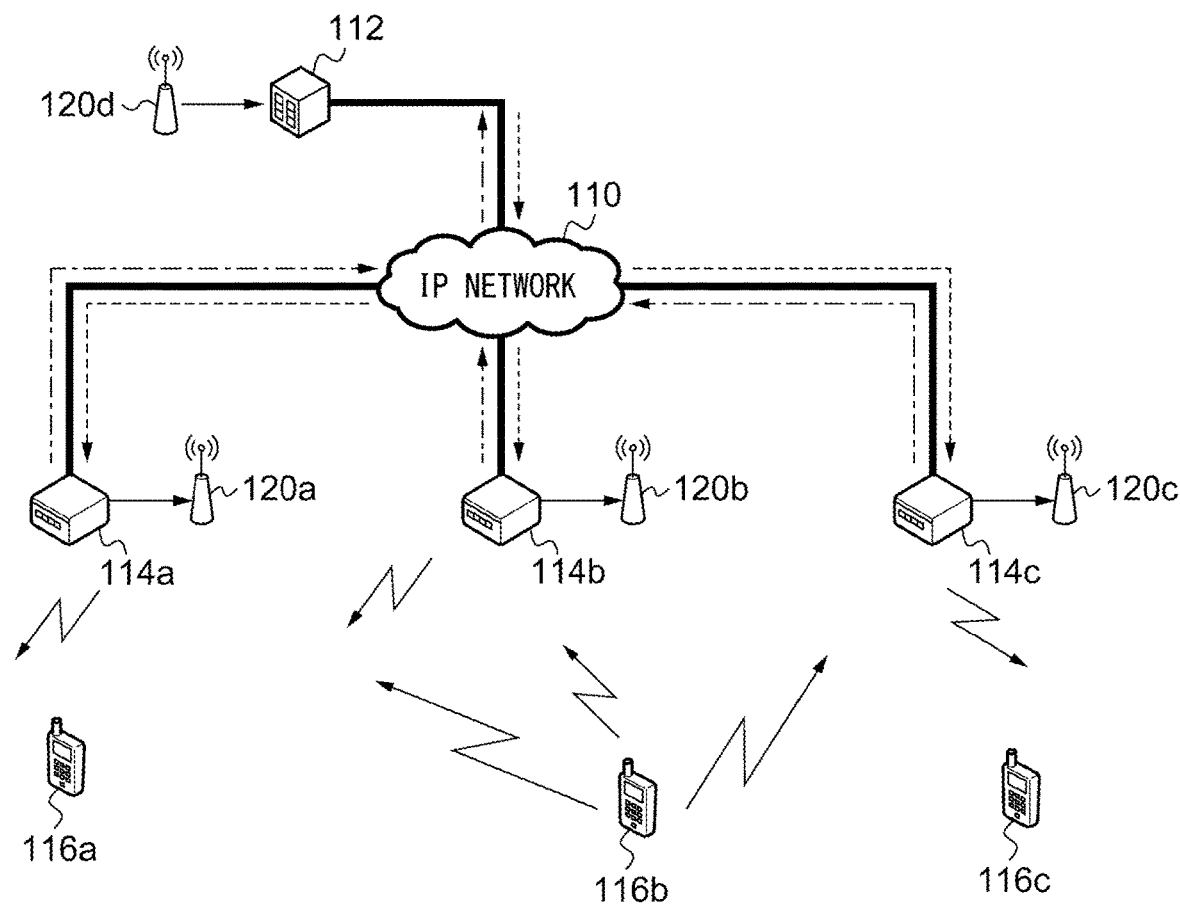
FIG. 1 shows a configuration of a communication system according to embodiment 1.

FIG. 1 shows a configuration of a communication system 200 according to embodiment 1. The communication system 100 includes an IP network 110, a control apparatus 112, a first base station apparatus 114a, a second base station apparatus 114b, and a third base station apparatus 114c, which are generically referred to as base station apparatuses 114, a first terminal apparatus 116a, a second terminal apparatus 116b, and a third terminal apparatus 116c, which are generically referred to as terminal apparatuses 116, and a first synchronization control reference apparatus 120a, a second synchronization control reference apparatus 120b, a third synchronization control reference apparatus 120c, and a fourth synchronization control reference apparatus 120d, which are generically referred to as synchronization control reference apparatuses 120. The number of base station apparatuses 114 included in the communication system 200 is not limited to "3", and the number of terminal apparatuses 116 is not limited to "3". A larger or smaller number of base station apparatuses or terminal apparatuses may be included.

As described above, the plurality of terminal apparatuses 116 and the plurality of base station apparatuses 114 are compatible with the business wireless system. Communication between the base station apparatuses 114 and the terminal apparatuses 116 is supported by a single frequency over a widespread area by restricting the frequency available for use. The scheme is referred to as a simulcast system. In a simulcast system, simulcast communication is performed across a plurality of base station apparatuses 114. In other words, the control apparatus 112 controls the base station apparatuses 114. When one base station apparatus 114 receives call information (transmitted information) from the terminal apparatus 116, the control apparatus 112 transfers the received call information to the plurality of base station apparatuses 114.

Each terminal apparatus 116 performs speech communication via one or more base station apparatuses 114. Each terminal apparatus 116 is provided with a push to talk (PTT) button, and the terminal apparatus 116 in which the PTT button is pressed transmits the call information including the speech of a user to the base station apparatuses 114. When the plurality of base station apparatuses 114 receive the call information from the terminal apparatus 116, the base station apparatuses 114 generate packet signals by packetizing the call information into IP packets and transmits the packet signals to the control apparatus 112 via the IP network 110. In other words, the packet signals will include speech data, which is characterized by a large data volume, when the terminal apparatus 116 performs speech communication. In this process, the plurality of base station apparatuses 114 measures Received Signal Strength Indicator (RSSI), an error rate of the call information, etc. as a measure of the quality of the call information. The plurality of base station apparatuses 114 include information (also called "quality information")) related to the quality of the received call information in the packet signal.

The control apparatus 112 receives the packet signals from the plurality of base station apparatuses 114 and selects the call information in the packet signal including the best quality information, based on the quality information included in the packet signals. The control apparatus 112 also generates information related to the time (hereinafter, referred to as "transmission time") when the plurality of base station apparatuses 114 should transmit the selected call information. Further, the control apparatus 112 transmits a packet signal including the transmission time and the call information to the plurality of base station apparatuses 114 via the IP network 110. The fourth synchronization control reference apparatus 120d is connected to the control apparatus 112. The fourth synchronization control reference apparatus 120d is, for example, a high-precision Network Time Protocol (NTP) server or a Global Positioning System (GPS) receiver. The fourth synchronization control reference apparatus 120d generates the time that serves as a reference (hereinafter, referred to as "reference time"), and the control apparatus 112 generates the transmission time based on the reference time.

Upon receiving the packet signal, the plurality of base station apparatuses 114 retrieve the transmission time and call information from the packet signal. The synchronization control reference apparatus 120 is also connected to each base station apparatus 114. The base station apparatus 114 transmits the call information when the reference time acquired from the synchronization control reference apparatus 120 is past the transmission time. Since the first synchronization control reference apparatus 120a through the fourth synchronization control reference apparatus 120d are synchronized, the first base station apparatus 114a through the third base station apparatus 114c transmit the call information at the same point of time. For this reason, the communication system 200 can be said to be a simulcast system. The terminal apparatus 116 receives the call information from the base station apparatus 114 and plays back the speech. This process is repeated periodically as long as the speech of the user using the one terminal apparatus 116 continues.

Figure 2:
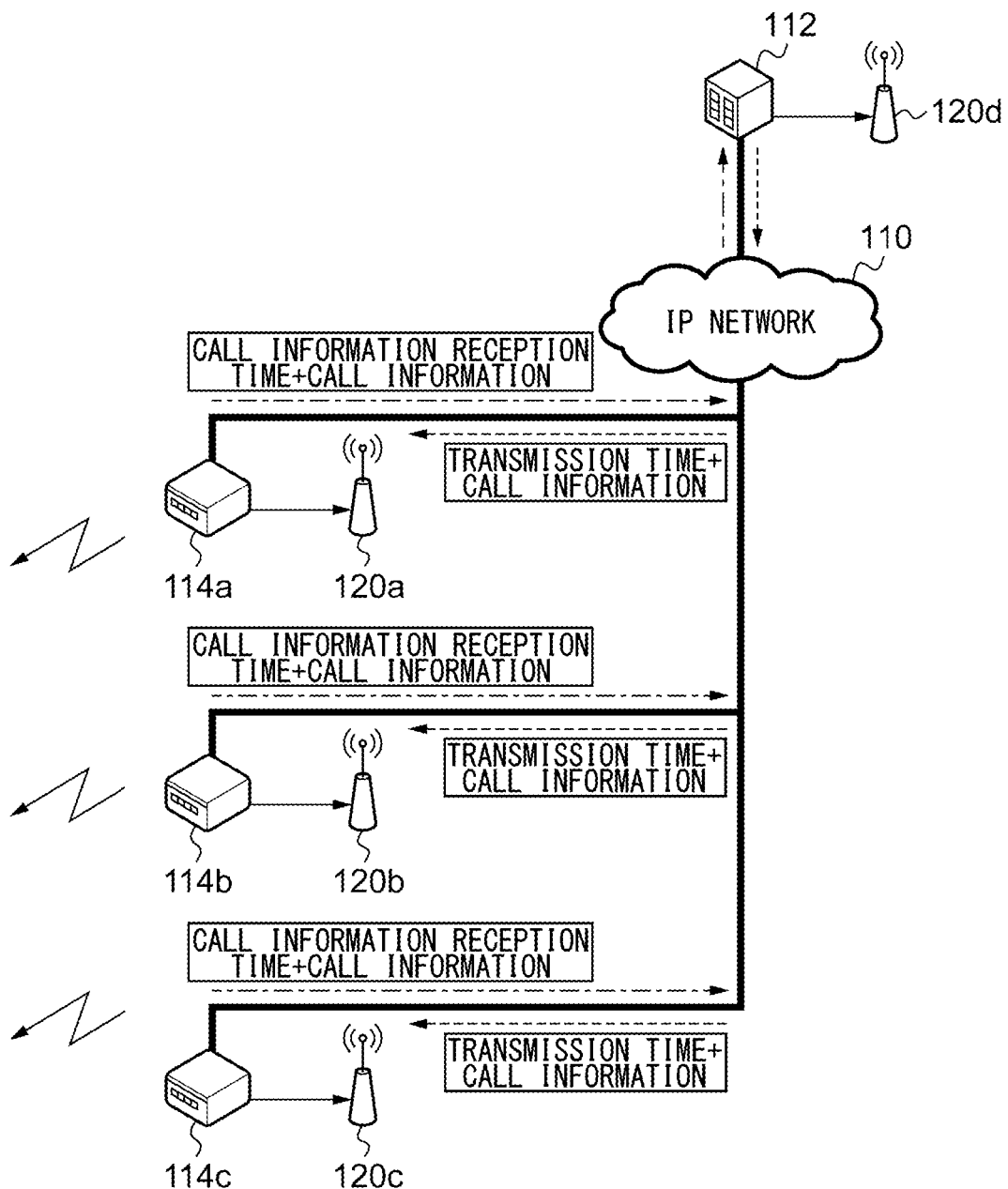
FIG. 2 shows an outline of the process in the communication system of FIG. 1.

FIG. 2 shows an outline of the process in the communication system 200 compared with embodiment 1. The packet signals transmitted by the base station apparatuses 114 including the first base station apparatus 114a through the third base station apparatus 114c to the control apparatus 112 via the IP network 110 include the call information and the call information reception time indicating the time when the base station apparatus 114 received the call information from the terminal apparatus 116. The control apparatus 112 stores the packet signal received from the base station apparatuses 114 in a buffer. When a difference in the call information reception time between a plurality of packet signals is within a certain range (e.g., several milliseconds), the control apparatus 112 determines that the same call information is included in the packet signals. The control apparatus 112 selects the call information with the highest quality from the plurality of call information items determined to be identical.

The control apparatus 112 generates a packet signal including the selected call information and the transmission and transmits the generated packet signal to the first base station apparatus 114a through the third base station apparatus 114c via the IP network 110. The transmission time is defined for the purpose of aligning the timing of transmission in all base station apparatuses 114 and so has the same value for all base station apparatuses 114. Further, the transmission time is configured to have a value that allows for a delay time in the IP network 110.

Figure 3:
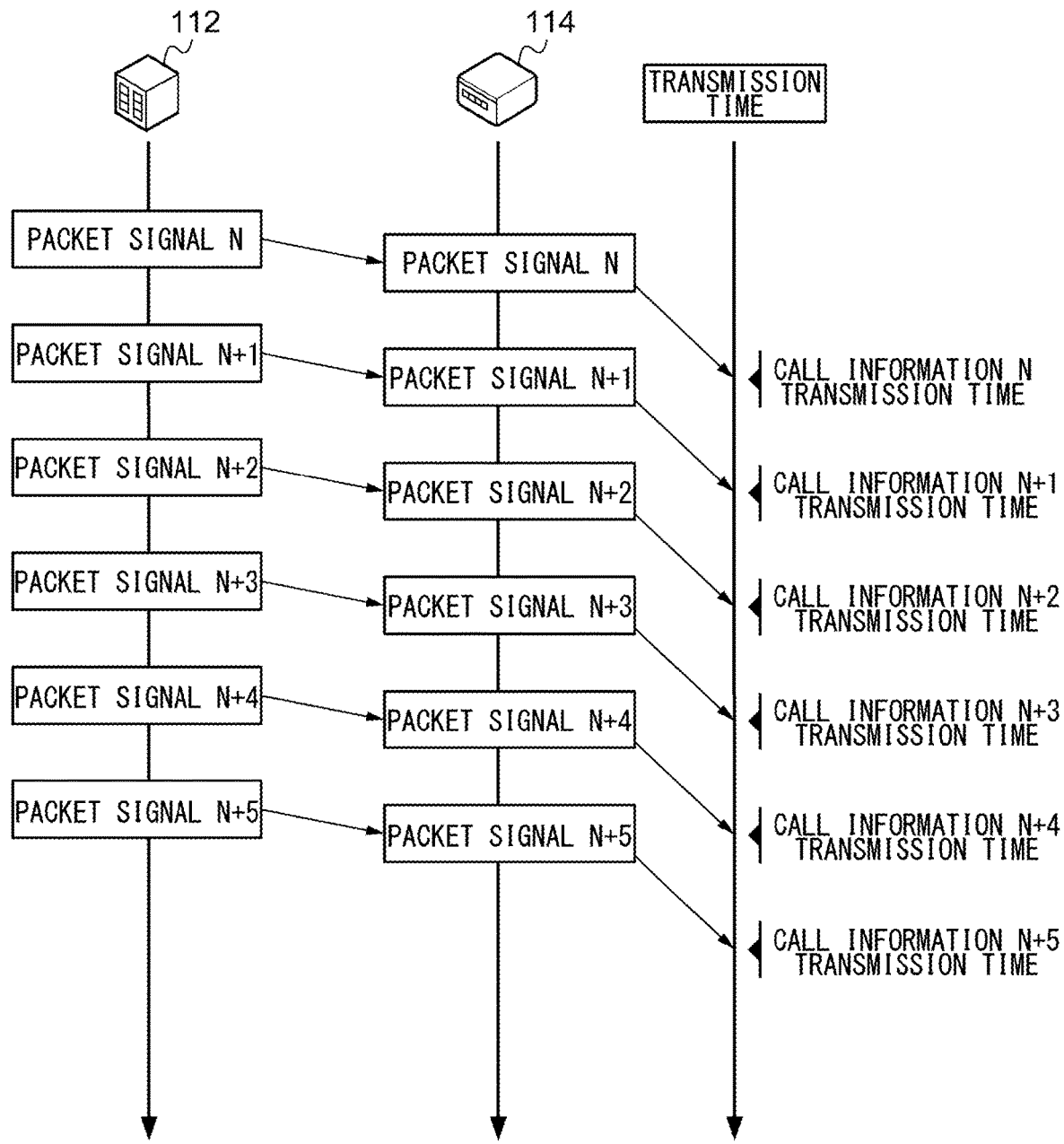
FIG. 3 shows an outline of the transmission process performed by the communication system of FIG. 1.

FIG. 3 shows an outline of the transmission process performed by the communication system 200 compared with embodiment 1. The control apparatus 112 transmits a packet signal N through a packet signal N+5 to the base station apparatus 114 at regular intervals. The base station apparatuses 114 store the packet signals in the respective buffers and extract the transmission time included in the packet signals. When the reference time obtained from the synchronization control reference apparatus 120 is past the transmission time, the base station apparatuses 114 transmit the call information. Thus, the call information N through the call information N+5 included in the packet signal N through the packet signal N+5, respectively, are transmitted at regular intervals. This ensures that, after the control apparatus 112 transmits the packet signals to the respective base station apparatuses 114, the base station apparatuses 114 transmit the call information simultaneously.

In the comparative communication system 200 described with reference to FIGS. 1 through 3, the call information received by the plurality of base station apparatuses 114 is transmitted to the control apparatus 112, and the control apparatus 112 aggregates and evaluates the call information from the plurality of base station apparatuses 114 and delivers the call information to the plurality of base station apparatuses 114. For this reason, at least one control apparatus 112 is required in the communication system 200 so that cost of the communication system 200 as a whole is increased. Since the call information is turned into an IP packet and transmitted and received by the plurality of base station apparatuses 114 and the control apparatus 112, the IP packet would include speech data etc., which are characterized by a large data volume. Accordingly, an increase in the load on the IP network 110 will result. The packet signal carrying the call information may not be transmitted and received properly depending on the condition of installation of the IP network 110 (best effort/guaranteed, etc.), the condition of traffic in use, or when the circuit speed (bandwidth) of the IP network 110 itself is low.

In the embodiment, the communication system is provided with a means that makes the control apparatus 112 unnecessary enables the communication system to be operated even when the circuit speed of the IP network 110 is low or when the traffic is heavy. When the plurality of base station apparatuses receive the call information from the terminal apparatus, the base station apparatuses evaluate the quality of the call information and quantitatively turns the call information into a numerical value indicating the quality score. The base station apparatuses multicast the quality score, which has a smaller data volume than the call information, to precede the other information. Further, only the base station apparatus providing the highest quality score multicasts the call information (speech data, etc.) after the received quality scores are aggregated.

Figure 4:
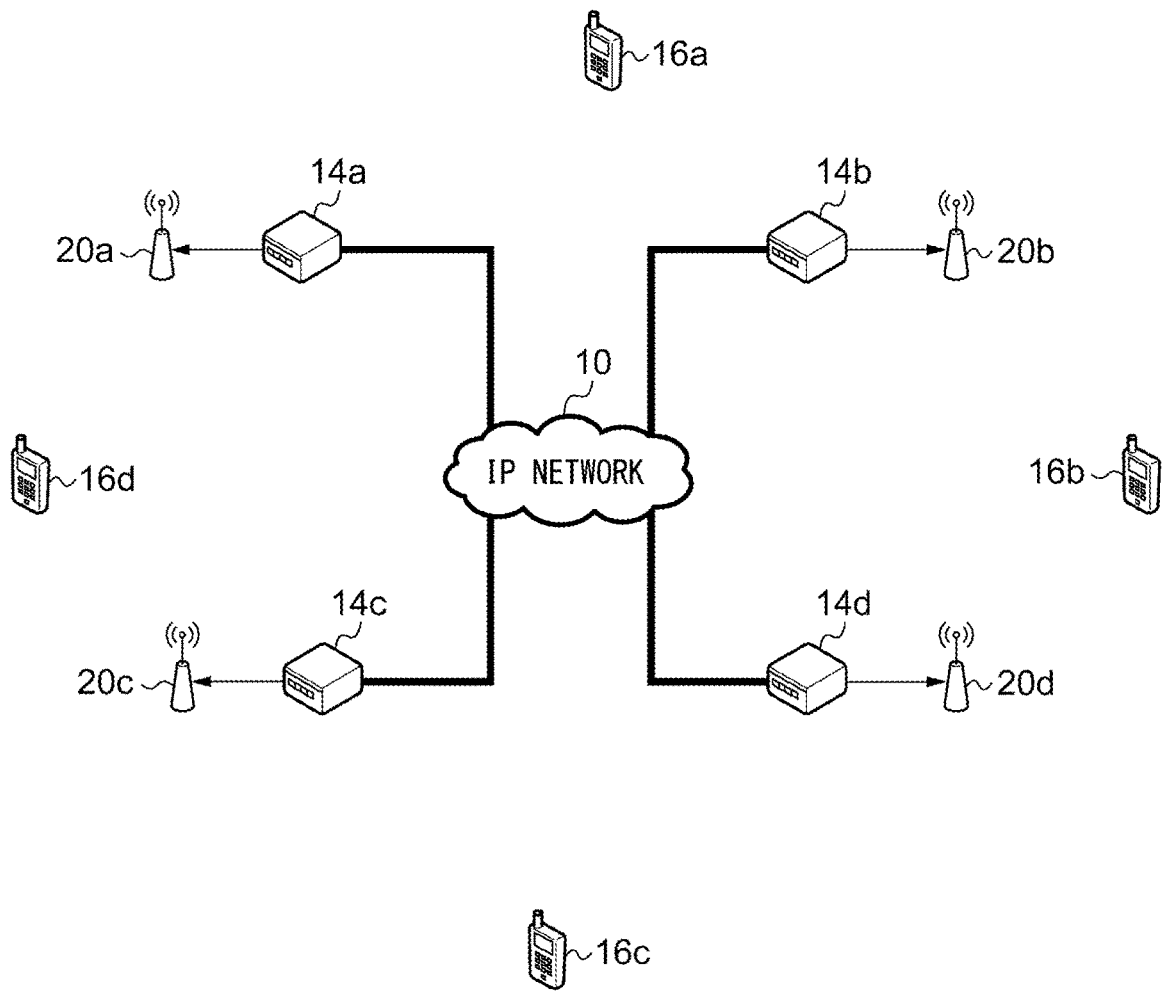
FIG. 4 shows a configuration of the communication system according to embodiment 1.

FIG. 4 shows a configuration of the communication system 100. The communication system 100 includes an IP network 10, a first base station apparatus 14a, a second base station apparatus 14b, a third base station apparatus 14c, and a fourth base station apparatus 14d, which are generically referred to as base station apparatuses 14, a first terminal apparatus 16a, a second terminal apparatus 16b, a third terminal apparatus 16c, and a fourth terminal apparatus 16d, which are generically referred to as terminal apparatuses 16, and a first synchronization control reference apparatus 20a, a second synchronization control reference apparatus 20b, a third synchronization control reference apparatus 20c, and a fourth synchronization control reference apparatus 20d, which are generically referred to as synchronization control reference apparatuses 20. The number of base station apparatuses 14, terminal apparatuses 16, and synchronization control reference apparatuses 20 included in the communication system 100 is not limited to "4". A larger or smaller number of base station apparatuses, terminal apparatuses, or synchronization control reference apparatuses may be included.

The IP network 10 is the same as the IP network 110 of FIG. 1. In this embodiment, a network that uses Internet Protocol (IP) is described by way of example, but networks that use other protocols may be used. The terminal apparatus 16 is the same as the terminal apparatus 116 of FIG. 1, and the synchronization control reference apparatus 20 is the same as the synchronization control reference apparatus 120 of FIG. 1 so that a description thereof is omitted. The base station apparatus 14 corresponds to the base station apparatus 114 of FIG. 1. Like the communication system 200, the communication system 100 can be said to be a simulcast system. The communication system 100 can be said to be a communication that performs a process based on a plurality of signals received by the plurality of base station apparatuses 14 respectively. The communication system 100 can also be said to be a communication system that compares the quality of the plurality of signals received by the plurality of base station apparatuses 14, respectively.

Figure 5:
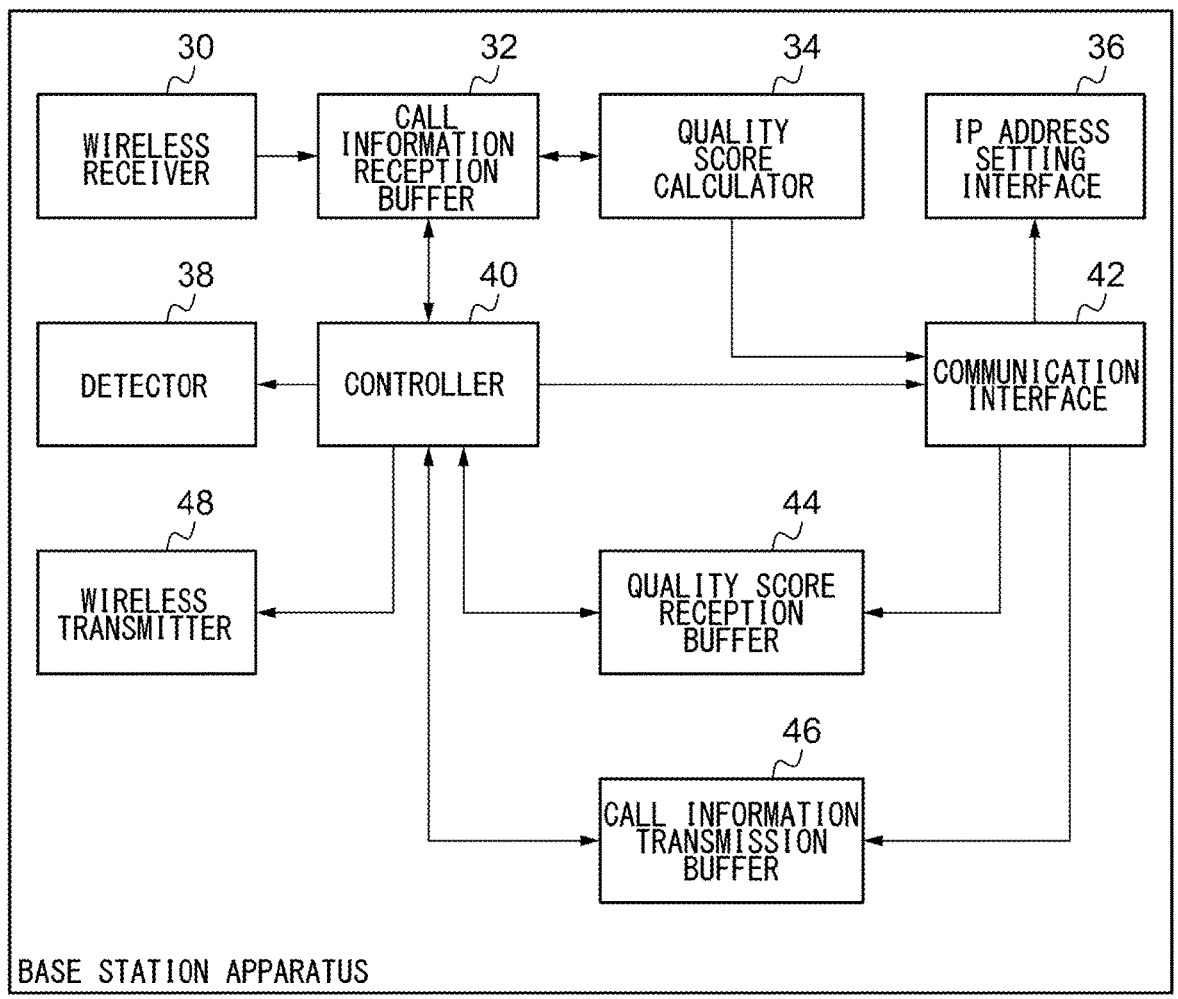
FIG. 5 shows a configuration of the base station apparatus of FIG. 4.

FIG. 5 shows a configuration of the base station apparatus 14. The base station apparatus 14 includes a wireless receiver 30, a call information reception buffer 32, a quality score calculator 34, an IP address setting interface 36, a detector 38, a controller 40, a communication interface 42, a quality score reception buffer 44, a call information transmission buffer 46, and a wireless transmitter 48.

The detector 38 is connected to the synchronization control reference apparatus 20 of FIG. 4 and acquires the reference time from the synchronization control reference apparatus 20 sequentially. The base station apparatus IP address, subnet mask, gateway address, and multicast address and port number for transmitting and receiving a quality score packet signal (described in detail below) and a call information packet signal (described in detail later) are set in the IP address setting interface 36. FIG. 6 shows a data structure of data stored in the IP address setting interface 36.

Difference base station apparatus IP addresses are set in the respective base station apparatuses 14. A multicast address and a port number for transmitting a quality score packet signal and a call information packet signal are set and commonly used in the systems. The content written in the IP address setting interface 36 is set in the communication interface 42 when the base station apparatus 14 is started. Reference is made back to FIG. 5.

A description will be given in the order of (1) reception process, (2) comparison process, and (3) wireless transmission process in accordance with the time series of the process.

(1) Reception Process

This is a process performed when the base station apparatus 14 receives call information from the terminal apparatus 16. By performing a reception process compatible with the business wireless system, the wireless receiver 30 receives a signal from the terminal apparatus 16. When the wireless receiver 30 receives call information from one terminal apparatus 16, the wireless receiver 30 acquires the reference time from the detector 38 as indicating call information reception time. The call information includes speech information. The wireless receiver 30 appends the call information reception time to the call information and writes the resultant information in the call information reception buffer 32, updating the buffer at constant intervals. For example, the period of updating is 100 msec.

FIG. 7 shows a data structure of data stored in the call information reception buffer 32. The call information reception time indicates the time that the call information is received from the terminal apparatus 16, and the data area includes the call information from the terminal apparatus 16 as call information data. In other words, the call information reception buffer 32 stores the call information received from the terminal apparatus 16 and the call information reception time capable of identifying the call information. The call information reception time may also be called the first identification information. The call information reception buffer 32 is capable of storing a certain number (e.g., 5) of call information data items. When the call information reception buffer 32 where the number of data items has reached the upper limit should be updated with new call information data, old call information with old call information reception time is sequentially deleted. Referring to FIG. 7, when the call information data with the call information reception time "10:10:32:502" should be newly written, the No. 01 call information data with the call information reception time "10:10:32:002" is deleted. "10:10:32:502" means "10 minutes 32 seconds 502 milliseconds past 10 o'clock" In other words, the call information reception time is data recorded with time precision on the order of milliseconds. Reference is made back to FIG. 5.

When the call information data is written in the call information reception buffer 32, the call information reception buffer 32 directs the quality score calculator 34 to calculate the quality score of the written call information data written. The quality score calculator 34 is also referred to as a calculator and calculates (derives) the quality score of the call information data for which the direction is given. In other words, the quality score calculator 34 calculates a quality score indicating the degree of quality of the call information received from the terminal apparatus 16 and stored in the call information reception buffer 32. The quality score related to the call information that the host base station apparatus 14 receives from the terminal apparatus 16 is called the first quality information. The following methods can be used to calculate the quality score of call information data.

(A) The first method uses RSSI. In this case, the RSSI value of the call information from the terminal apparatus 16 received by the wireless receiver 30 is recorded in the call information data. The quality score calculator 34 sets the RSSI value as the quality score. In the case of this method, the larger the value of the quality score, the higher the quality of the call information determined. The RSSI value itself may be used as the quality score. Alternatively, the RSSI values may be organized into predetermined categories such as "high", "medium", "low", etc. A numerical value corresponding to the category (e.g., "high"=3, "medium"=2, "low"=1) may be used as the quality score.

(B) The second method uses information related to an error. In this case, a numerical value indicating the volume of errors (the number of errors, error rate, etc.) occurring in wireless communication for receiving the call information from the terminal apparatus 16 by the wireless receiver 30 or a numerical value indicating the volume of errors (the number of errors, error rate, etc.) corrected by the error correction process are indicated in the call information data. The quality score calculator 34 sets a numerical value indicating the degree of errors as a quality score. In the case of this method, the smaller the value of the quality score, the higher the quality of the call information determined. The volumes of errors may be converted into predetermined categories such as "large", "medium", "small", etc., and a numerical value corresponding to the category may be used as the quality score.

(C) The third method used call information data. The quality score calculator 34 subjects the call information data to signal analysis to detect a noise component other than the speech. For example, frequency components outside the bandwidth unique to speech or components with the amplitude that varies temporally in a predetermined value or larger are totaled as noise components to define the quality score. In the case of this method, the smaller the value of the quality score, the higher the quality of the call information determined. The quality score calculator 34 may calculate both the speech component and the noise component to calculate the SN ratio indicating the ratio between the components to define the quality score. In the case of this method, the larger the value of the quality score, the higher the quality of the call information determined. In the case that a packet signal includes image data or video data, noise components in the image data (video data) may be detected and reflected in the quality score. Alternatively, both the noise in the speech data and the noise in the vide data may be detected and reflected in the quality score.

The quality score calculator 34 may combine the first through third methods to define the quality score. For example, an overall score S may be calculated according to the calculation given by expression (1), where the RSSI value is denoted by R, the numerical value indicating the degree of errors is denoted by E, and the numerical value indicating the noise component is denoted by N. It should be noted that $\alpha$, $\beta$, $\gamma$ are weight coefficients, where $\alpha > 0$, $\beta < 0$, and $\gamma < 0$. The quality score calculator 34 defines the overall score S as the quality score.

$$S = \alpha R + \beta E + \gamma N \tag{1}$$

In the case of this method, the larger the value of the quality score, the higher the quality of the call information determined.

Figure 9:
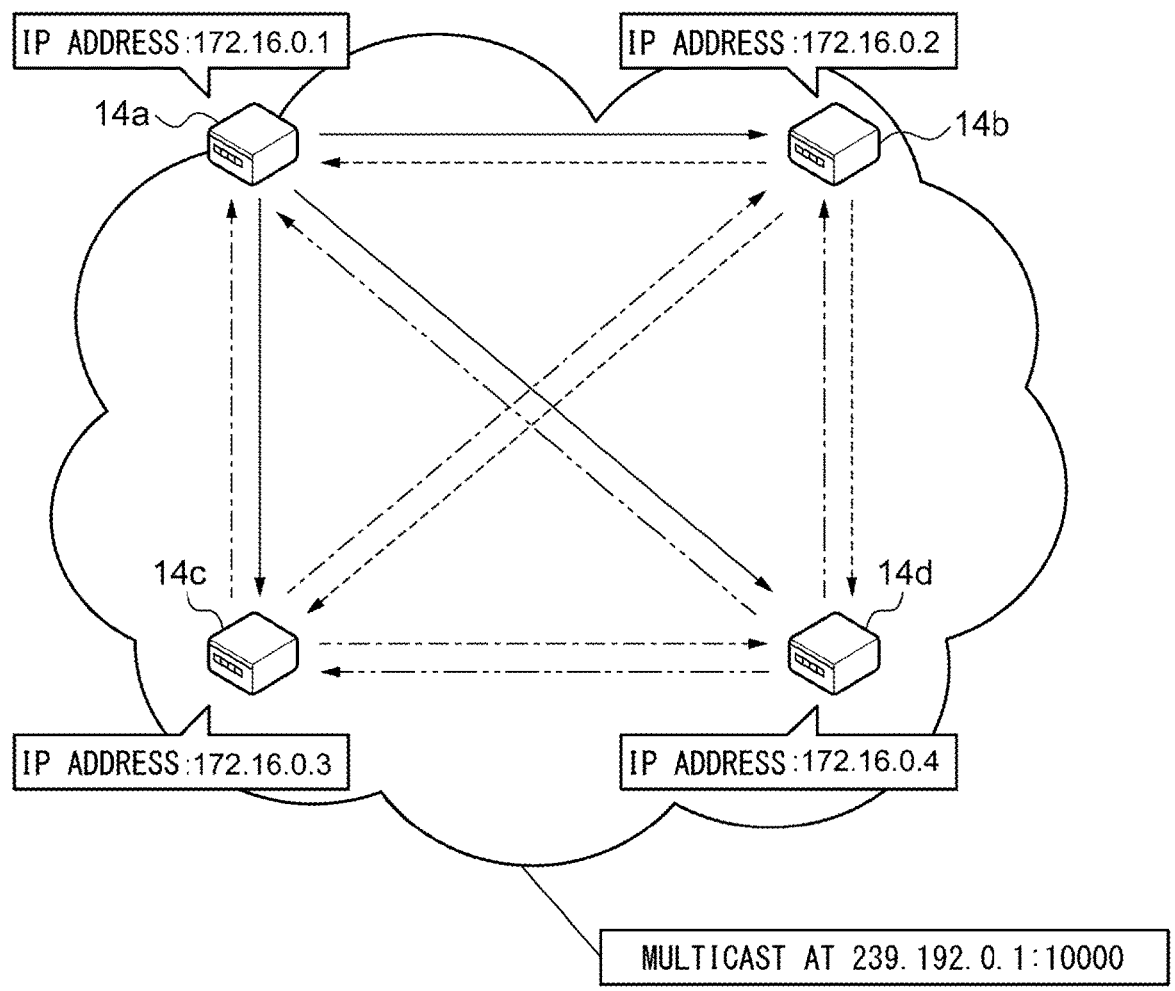
FIG. 9 shows transmission and reception of a quality score packet signal by the communication system of FIG. 4.

After calculating the quality score, the quality score calculator 34 outputs the call information reception time and the quality score of the call information data to the communication interface 42. The communication interface 42 packetizes the call information reception time and the quality score received into a quality score packet signal. FIG. 8 shows a data structure of a quality score packet signal transmitted from the communication interface 42. The quality score packet signal includes the call information reception time and the quality score. Reference is made back to FIG. 5. The communication interface 42 sets a quality score packet transmission and reception multicast address described in the IP address setting interface 36 as the destination of the quality score packet signal and then transmits the quality score packet signal. The communication interface 42 can be said to be a notification interface. The communication interface 42 notifies the other base station apparatuses 14 of the call information reception time and the quality score in a multicast scheme of communication. FIG. 9 shows transmission and reception of a quality score packet signal by the communication system 100. The first base station apparatus 14a, the second base station apparatus 14b, the third base station apparatus 14c, and the fourth base station apparatus 14d receive call information from the terminal apparatus 16 and delivers a quality score packet signal in a multicast scheme of communication. Reference is made back to FIG. 5.

(2) Comparison Process

This is the process performed when the base station apparatus 14 receives a quality score packet signal at the quality score packet transmission and reception multicast address. The communication interface 42 receives the quality score packet signal at the quality score packet transmission and reception multicast address. The communication interface 42 can be said to be an acquisition interface. The communication interface 42 acquires the quality score indicating the degree of quality of the call information that the other base station apparatus 14 receives from the terminal apparatus 16 and also acquires the call information reception time indicating the time when the other base station apparatus 14 receives the call information from the terminal apparatus 16. The quality score related to the call information that the other base station apparatus 14 receives from the terminal apparatus 16 may be referred to as the second quality information, and the call information reception time may be referred to as the second identification information.

The quality score reception buffer 44 stores the quality score packet signal received by the communication interface 42. FIG. 10 shows a data structure of data stored in the quality score reception buffer 44. The packet reception time field stores the time that the quality score packet signal transmitted from the other base station apparatus 14 was received, and the transmitting base station apparatus address field stores the IP address of the base station apparatus 14 that transmitted the quality score packet signal. Further, the call information reception time field and the quality score field store the content of the quality score packet signal received directly. In the embodiment, both the packet reception time and the call information reception time are data recorded with time precision on the order of milliseconds. Since the quality score packet signal is multicast, the quality score packet signal delivered by the host apparatus shall also be received by the communication interface 42 and stored in the quality score reception buffer 44. Reference is made back to FIG. 5.

Figure 11:
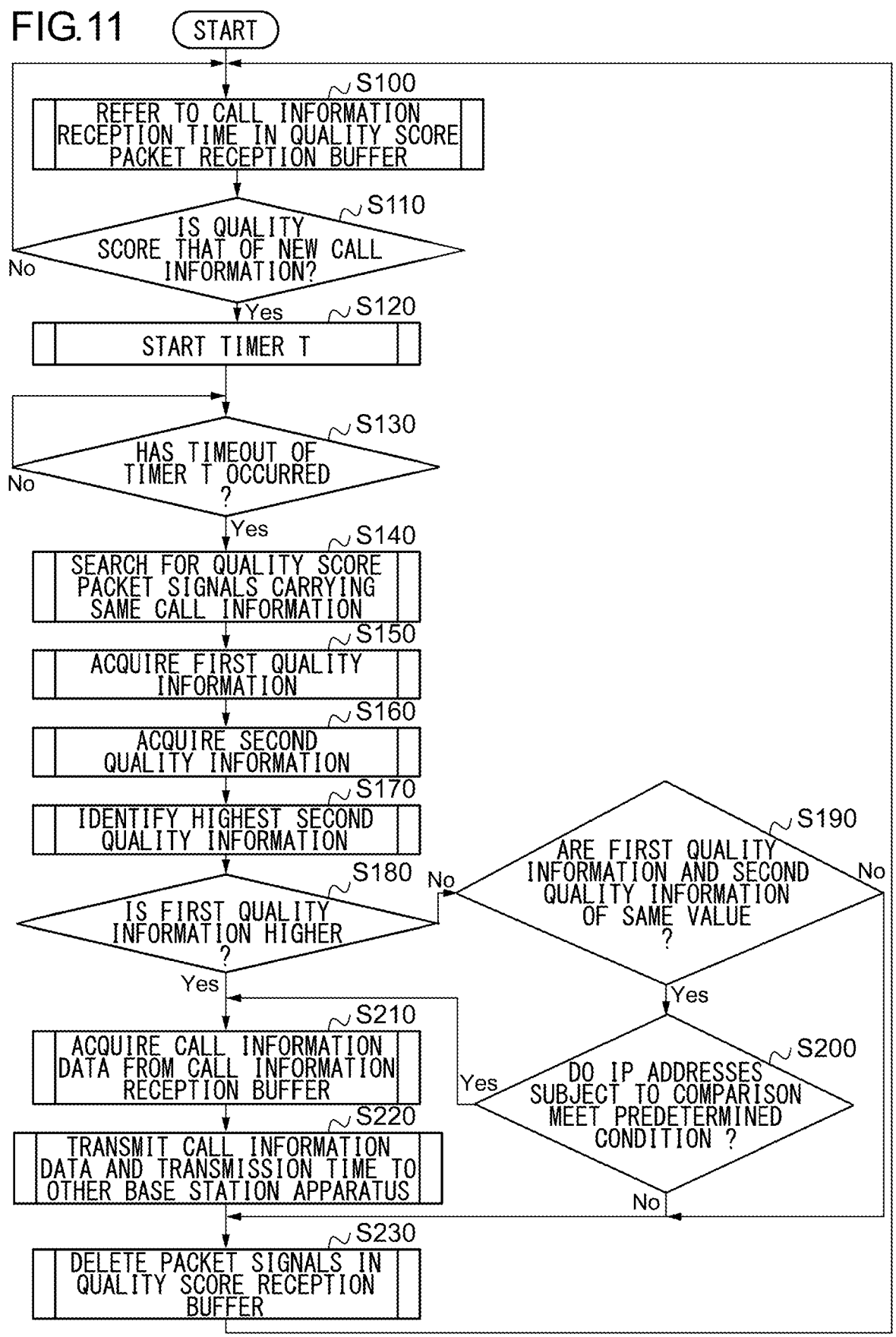
FIG. 11 is a flowchart showing processing steps performed by the base station apparatus of FIG. 5.

A description will be given of the process in the base station apparatus 14, and, in particular, the controller 40 with reference to FIGS. 10 and 11. The controller 40 performing this process may also be referred to as a determination interface. FIG. 11 is a flowchart showing processing steps performed by the base station apparatus 14. The controller 40 refers to the call information reception time of the quality scores written in the quality score reception buffer 44 (S100). The controller 40 then determines whether there is a quality score packet signal carrying new call information (S110). When there is a quality score packet signal carrying new call information (S110: Yes), control proceeds to S120. When there isn't (S110: No), control is returned to S100, whereupon the step is repeated.

Whether the call information is new is determined by referring to the call information reception time in the quality score packet signal. In the example of FIG. 10, the call information reception time of the No. 04 quality score packet signal is "10:10:32:003", and the call information reception time of the No. 05 quality score packet signal is "10:10:32:103", meaning that there is an interval of 100 milliseconds. Therefore, in the case the No. 04 and earlier signals were processed in the past, the controller 40 determines that the No. 05 and later signals carry new call information. In other words, in the case the call information reception time of a given quality score packet signal is past the latest call information reception time of the quality score packet signals processed in the past by the first predetermined period of time (e.g., 10 milliseconds) or more, the given quality score packet signal is determined to correspond to new call information. In the following description, the quality score packet signal corresponding to new call information and received first may be referred to the "first quality score packet signal in the sequence", the "first packet signal in the sequence", or the like.

In S120, the controller 40 activates the timer T, starting the timer count at the packet reception time of the first packet signal in the sequence (the No. 05 quality score packet signal in the example of FIG. 10). In other words, when a quality score packet signal is determined to carry new information, the controller 40 activates the timer T, stating the timer count at the reception time of that quality score packet signal. The expiration time of the timer T is set in accordance with the circuit speed of the IP network 10 or the like. In this embodiment, the expiration time is about 50 milliseconds, for example. In S130, when a timeout has not occurred in the timer T (S130: No), the controller 40 waits until a timeout. After the timeout (S130: Yes), control proceeds to S140.

In S140, the controller 40 searches the quality score packet signals written in the quality score reception buffer 44 while the timer T is being activated for quality score packet signals carrying the same call information. Control then proceeds to S150. A determination that signals carry the same call information is made when the difference between the call information reception time of the first packet signal in the sequence and the call information reception time of a packet signal subject to comparison is less than the first predetermined period of time. In the example of FIG. 10, the No. 05 packet signal from the base station apparatus 14 of the IP address "172.16.0.1" through the No, 08 packet signal from the base station apparatus 14 of the IP address "172.16.0.3" have been received. Given that the first predetermined period of time is 10 milliseconds, for example, the call information reception time of the No. 06, No. 07, and No. 08 quality score packet signals will be "10:10:32:102", "10:10:32:103", and "10:10:32:102", respectively. The difference of these points of time from the call information reception time "10:10:32:103" of the No. 05 quality score packet signal is 10 milliseconds or smaller equally so that the controller 40 determines that No. 5~No. 8 indicate the quality score of the same call information.

In S150, the controller 40 acquires the quality score corresponding to the call information received by the host base station apparatus 14 from the terminal apparatus 16, from among the quality score packet signals identified by the search in S140. In other words, the controller 40 acquires the first quality information. More specifically, the controller 40 may identify the quality score packet signal having the transmitting base station apparatus address that matches the base station apparatus IP address set in the IP address setting interface 36 and may acquire the quality score of the identified signal. In the case the IP address of the host base station apparatus 14 is "172.16.0.3", for example, the IP address of No. 08, of the No. 05~No. 08 quality score packet signals, is "172.16.0.3" in the example of FIG. 10 so that the controller 40 acquires the quality score "91" of No. 08.

Next, in step S160, the controller 40 acquires, from among the quality score packets identified by the search in S140, the quality score corresponding to the call information received by the other base station apparatus 14 from the terminal apparatus 16. In other words, the controller 40 acquires the second identification information. More specifically, the controller 40 identifies, from among the quality score packet signals identified by the search in S140, the packets other than the quality score packet identified in S150 and acquires the quality scores of all identified packets. In the example of FIG. 10, the No. 05, No. 06, and No. 07 quality score packet signals meet the definition, and the controller 40 acquires the quality scores "65", "61", and "76" of the signals.

Next, in step S170, the controller 40 identifies the highest value among the quality scores acquired in S160. In other words, the controller 40 identifies the second quality information having the highest value. In the above example, the highest value from "65", "61", and "76" is "76". When only one quality score is acquired in S160, the step of S170 can be omitted. When there are a plurality of second quality information items having the highest value, the IP address that meets a predetermined condition (first predetermined condition) is selected from the IP addresses of the relevant base station apparatuses 14 and stores the selected IP address in a memory inside the controller 40. In this embodiment, the predetermined condition requires that the IP address with the smallest number be used. When there are three quality scores that are acquired in S160 and the scores have the same value (e.g., "80"), the base station apparatus 14 having the IP address with the smallest number is selected from the three base station apparatuses 14. Given that the three IP addresses are "172:16.0.1", "172.16.0.2", and "172.16.0.4", "172.16.0.1" is selected.

Next, in S180, the controller 40 compares the first quality information acquired in S150 and the second quality information having the largest value identified in S170 and determines whether the first quality information is higher (larger). In the above-described example, the first quality information is "91", and the second quality information is "76" so that a determination is made that the first quality information is higher. When the first quality information is higher (S180: Yes), controller proceeds to S210. When the first quality information is not higher (S180: No), i.e., when the value of the first quality information is equal to or lower than the value of the second quality information, control proceeds to S190.

In S190, the controller 40 determines whether the value of the first quality information is equal to the value of the second quality information. When the values are equal (S190: Yes), control proceeds to S200. When the values are different (S190: No), i.e., when the value of the first quality information is lower (smaller) than the highest value of the second quality information, control proceeds to S230.

In S200, the controller 40 compares the IP address (first IP address) of the host base station apparatus 14 with the IP address (second IP address) of the other base station apparatus 14 corresponding to the second quality information of the highest value and determines whether the two IP addresses subject to comparison meet a predetermined condition (second predetermined condition). The predetermined condition in this embodiment requires that the first IP address have a smaller (earlier) number than the second IP address. As described later, the process is equivalent to selecting one base station apparatus 14 based on the information for identifying the base station apparatus 14, when the first quality information and the second quality information are equal. The IP address can be said to be the information (identifier) for identifying the base station apparatus 14. When the IP address is stored in the memory inside the controller 40 in S170, the stored IP address is used as the second IP address. When the two IP addresses subject to comparison meet the predetermined condition (S200: yes), control proceeds to S210. When the two IP addresses subject to comparison do not meet the predetermined condition (S200: No), control proceeds to S230.

In S210, the controller 40 acquires the call information data corresponding to the first quality information acquired in S150 from the call information reception buffer 32. More specifically, the controller 40 acquires, from the call information reception buffer 32, the call information data in which the call information reception time identical to the call information reception time of the first quality information is recorded. Control then proceeds to S220. In the example of FIG. 10, the first quality information is the No. 08 quality score packet signal, and the call information reception time thereof is "10:10:32:102". In the case the data shown in FIG. 7 is stored in the call information reception buffer 32 of the base station apparatus 14 in which the IP address is set to "172.16.0.3", the No. 02 call information data having the call information reception time "10:10:32: 102" is identified.

In S220, the controller 40 communicates the call information data acquired in S210 and the transmission time to the communication interface 42. The transmission time is set to the time past the call information reception time of the packet signal by a second predetermined period of time. The second predetermined period of time is adjusted according to the circuit speed of the IP network 10, etc. For example, the time past the call information reception time of the communicated packet signal by 100 milliseconds may be set as the transmission time.

Figure 12:
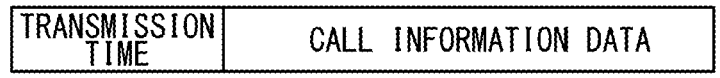
FIG. 12 shows a data structure of a call information packet signal transmitted from the communication interface of FIG. 5.

The communication interface 42 packetizes the transmission time and the call information data that are communicated into a call information packet signal. The communication interface 42 transmits the call information packet signal to the other base station apparatus 14 via the IP network 10. FIG. 12 shows a data structure of a call information packet signal transmitted from the communication interface 42. As shown in the figure, the call information packet signal includes the transmission time and the call information data. The communication interface 42 of FIG. 5 transmits the call information packet signal to the call information packet transmission and reception multicast address written in the IP address setting interface 36. In other words, the communication interface 42, which is transmitting interface, transmits the call information packet signal including the call information received from the terminal apparatus 16 when the controller 40 determines that the quality of the first quality information is higher.

Figure 13:
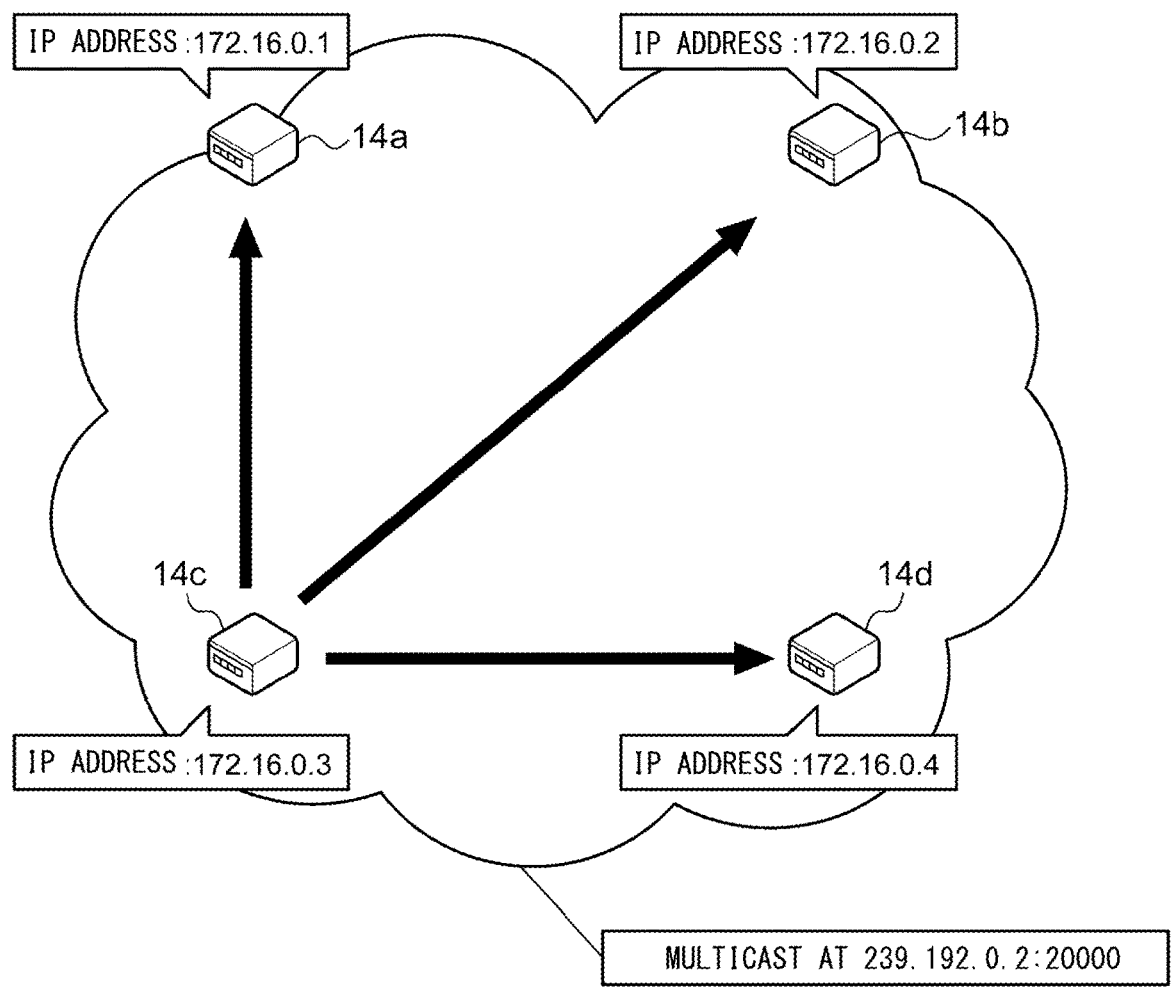
FIG. 13 shows transmission and reception of a call information packet signal by the communication system of FIG. 4.

FIG. 13 shows transmission and reception of a call information packet signal by the communication system 100. The figure shows that the third base station apparatus 14c in which the IP address is set to "172.16.0.3" transmits the call information packet signal to the call information packet transmission and reception multicast address. Reference is made back to FIG. 11. Control proceeds from S220 to S230. In S230, the controller 40 deletes, of the quality score packet signals recorded in the quality score reception buffer 44, those packet signals for which a predetermined period of time (e.g., one minute or longer) has passed since the reception. The period of time subject to deletion may be modified to an appropriate period according to the buffer size in the base station apparatus 14, etc. Control is returned from S230 to S100, whereupon the step is repeated.

As described above, when a plurality of second identification information items having the highest value are found in S170, the IP address that meets the first predetermined condition is selected from the IP addresses of the plurality of relevant base station apparatuses 14. In S200, a determination is made as to whether the two IP addresses meet the second predetermined condition. In this embodiment, the first predetermined condition requires that the IP address with the smallest number be used, and the second predetermined condition requires that the first IP address have a smaller number than the second IP address. By performing such steps, the number of base station apparatuses 14 that transmit the call information packet signal is limited to one in S220 even when the first quality information and the second quality information have the same value. Thereby, transmission of call information packet signals from a plurality of base station apparatuses 14 is prevented. Even when the quality scores of the host base station apparatus 14 and the other base station apparatuses 14 are of the same value, the number of base station apparatuses 14 that transmit the call information packet signal is limited to one. This allows the communication system to be operated efficiently without increasing the traffic over the network wastefully.

Conditions different from the first predetermined condition and the second predetermined condition described above may be used. For example, the first predetermined condition may require using the IP address with the largest number, and the second predetermined condition may require that the first IP address be a number larger than the second IP address. A similar process may be performed by using a network address other than an IP address. More specifically, given that the first quality information and the second quality information have the same value, a determination may be made as to whether the host base station apparatus 14 transmits the call information packet signal based on the network addresses of the base station apparatuses 14. By performing such a step, it is ensured that the call information is transmitted from only one base station apparatus 14 even when the value of the first quality information is equal to the highest value of the second quality information. A similar process may be performed by using information other than the network address. For example, provided that identification information (identifier) capable of identifying the base station apparatus 14 uniquely is available, that information may be used to select the one base station apparatus 14 that transmits the call information packet signal. For example, the serial number of the base station apparatus 14 may be used. The IP address and the network address of the base station apparatus 14 can be said to be an identifier. Reference is made back to FIG. 5.

(3) Wireless Transmission Process

This is a process performed when the base station apparatus 14 receives the call information packet signal at the call information packet transmission and reception multicast address. The communication interface 42 stores the call information packet signal received at the call information packet transmission and reception multicast address in the call information transmission buffer 46. FIG. 14 shows a data structure of data stored in the call information transmission buffer 46. The transmission time field and the data area store the content of the call information packet signal directly. Since the call information packet signal is multicast, the call information packet signal delivered by the host apparatus may also be received by the communication interface 42 and stored in the call information transmission buffer 46. Reference is made back to FIG. 5.

The controller 40 monitors the transmission time of the call information packet signal in the call information transmission buffer 46 and checks whether there is a call information packet signal for which the reference time is past the transmission time. In the case that there is a call information packet signal for which the reference time is past the transmission time, the controller 40 directs the wireless transmitter 48 to transmit the call information of the call information packet signal. Thereafter, the controller 40 deletes the transmitted call information packet signal in the call information transmission buffer 46.

The base station apparatus 14 described above is implemented in hardware such as a CPU, a memory, or other LSI's of an arbitrary computer, and in software such as a program loaded into a memory, etc. The figure depicts functional blocks implemented by the coordination of these elements. Therefore, it will be understood by those skilled in the art that the functional blocks may be implemented in a variety of manners by hardware only or by a combination of hardware and software. The functional blocks may be implemented as a program for performing a distributed process by using a plurality of computers. For example, a plurality of computers may be caused to process different functions so that the functions of the base station apparatus 14 are implemented by the plurality of computers.

According to the embodiment, the calculated quality score and the quality score acquired from the other base station apparatus are compared, and the call information packet signal is transmitted when the quality of the calculated quality score is higher. Accordingly, it is ensured that the call information packet signal is transmitted from only one base station apparatus. Since the call information packet signal is transmitted from only one base station apparatus, the number of call information packet signals, which require a large volume of data to be transmitted and received over the IP network, is reduced. Also, since the number of call information packet signals is reduced, the traffic over the IP network is inhibited from increasing. In other words, the network traffic is inhibited from increasing in a communication system in which the process is performed based on a plurality of signals respectively received in a plurality of base station apparatuses. Since the traffic over the IP network is inhibited from increasing, the system can be operated in a relatively stable condition even when the communication quality of the IP network is not so high. Since the traffic over the IP network is inhibited from increasing, the communication system can be operated even when the circuit speed of the IP network is low. Since the installation of a control apparatus is unnecessary, the cost to build the communication system is reduced.

Since the calculated quality score and the acquired quality score are compared based on the call information reception time, the same call information transmitted from the terminal apparatus is identified. Since the call information reception time and the quality score are communicated to the other base station apparatus, the other base station apparatus is allowed to use the call information reception time and the quality score. Since the call information reception time and the quality score are multicast to the other base station apparatus, the process is efficiently performed. Of the plurality of items of call information reception time acquired, the reception time for which the difference from the call information reception time stored is within a predetermined range is identified so that the process is simplified. At least one of the strength of the received signal, degree of errors, and noise is used as the quality score so that the score of quality is turned into a numerical value properly.

Embodiment 2

A description will now be given of embodiment 2. Like embodiment 1, embodiment 2 relates to a communication system including a plurality of terminal apparatuses configured to communicate with each other via a base station apparatus. The configuration of embodiment 2 differs from the configuration of embodiment 1.

Figure 15:
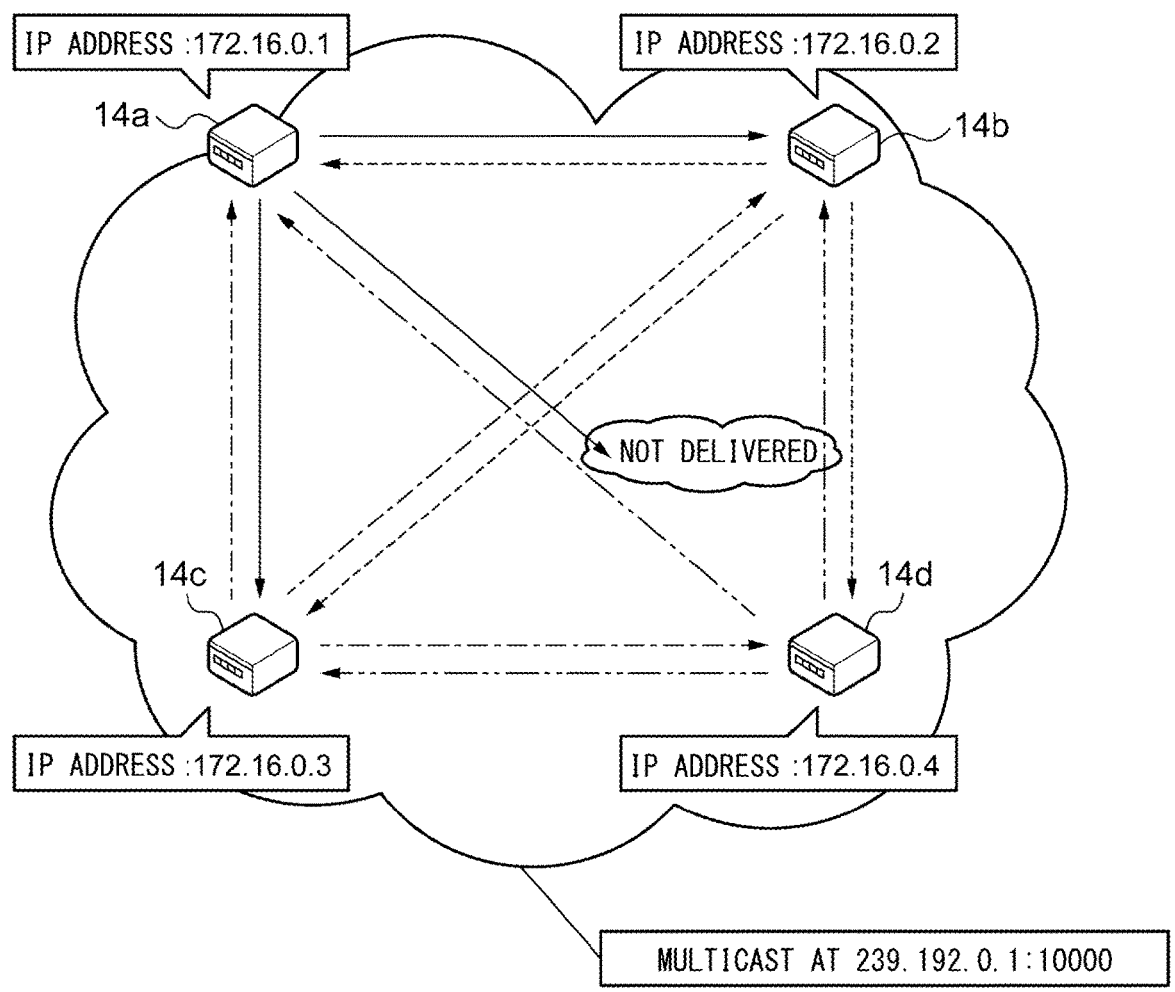
FIG. 15 illustrates the necessity of the process of embodiment 2.

FIG. 15 illustrates the necessity of the process of embodiment 2. In embodiment 1, the quality score packet signal is delivered and received by the base station apparatuses 14 in a multicast scheme of communication. In the case of multicast scheme, user datagram protocol (UDP) is generally used as a transport protocol. UDP is a connectionless protocol and so does not guarantee that the quality score packet signal multicast from the base station apparatus 14 is properly received by all base station apparatuses 14 in the communication system 100.

FIG. 15 shows that first base station apparatus 14a, the second base station apparatus 14b, the third base station apparatus 14c, and the fourth base station apparatus 14d receive the call information from the terminal apparatus 16 and multicast the quality score packet signal. However, the quality score packet signal delivered from the first base station apparatus 14a is not received by the fourth base station apparatus 14d. In this process, the quality score reception buffers 44 of the three base station apparatuses 14 other than the fourth base station apparatus 14d include the quality score packet signals from the first base station apparatus 14a, the second base station apparatus 14b, the third base station apparatus 14c, and the fourth base station apparatus 14d. Meanwhile, the quality score reception buffer 44 of the fourth base station apparatus 14d does not include the quality score packet signal from the first base station apparatus 14a.

Examples of the quality score reception buffers 44 of the first base station apparatus 14a and the fourth base station apparatus 14d in this situation are shown in FIGS. 16A-16B. FIGS. 16A-16B show a data structure of data stored in the quality score reception buffer 44. FIG. 16A corresponds to the quality score reception buffer 44 of the first base station apparatus 14a, and FIG. 16B corresponds to the quality score reception buffer 44 of the fourth base station apparatus 14d. Referring to FIGS. 16A and 16B, the IP address of the first base station apparatus 14a is "172.16.0.1", and the IP address of the fourth base station apparatus 14d is "172.16.0.4". In the process according to the flowchart of FIG. 11 described above, the No. 01 quality score packet signal with the quality score of 90 is identified as the first quality information, and the No. 03 quality score packet signal is identified as the second quality information in the first base station apparatus 14a. In this case, the first quality information is higher so that the call information packet signal including the call information data corresponding to the first quality information (No. 01 quality score packet signal) is transmitted from the first base station apparatus 14a to the other base station apparatuses 14. Meanwhile, the No. 02 quality score packet signal with the quality score of 75 is identified as the first quality information, and the No. 01 quality score packet signal is identified as the second quality information in the fourth base station apparatus 14d. The first quality information is higher in the fourth base station apparatus 14d, too. Therefore, the call information packet signal including the call information data corresponding to the first quality information (No. 02 quality score packet signal) is transmitted to the other base station apparatuses 14.

This result is the same call information being transmitted from the two base station apparatuses 14. The base station apparatuses 14 receiving the call information packet signals cannot know which call information should be transmitted. This may result in neither of the signals being transmitted or the same call information being transmitted twice. When the two base station apparatuses 14 receive the same call information, each base station apparatus 14 may transmit only the data received first from the wireless transmitter 48. This may, however, result in a complicated process or radio interference owing to the transmission of different data between the base station apparatuses 14.

Figure 17:
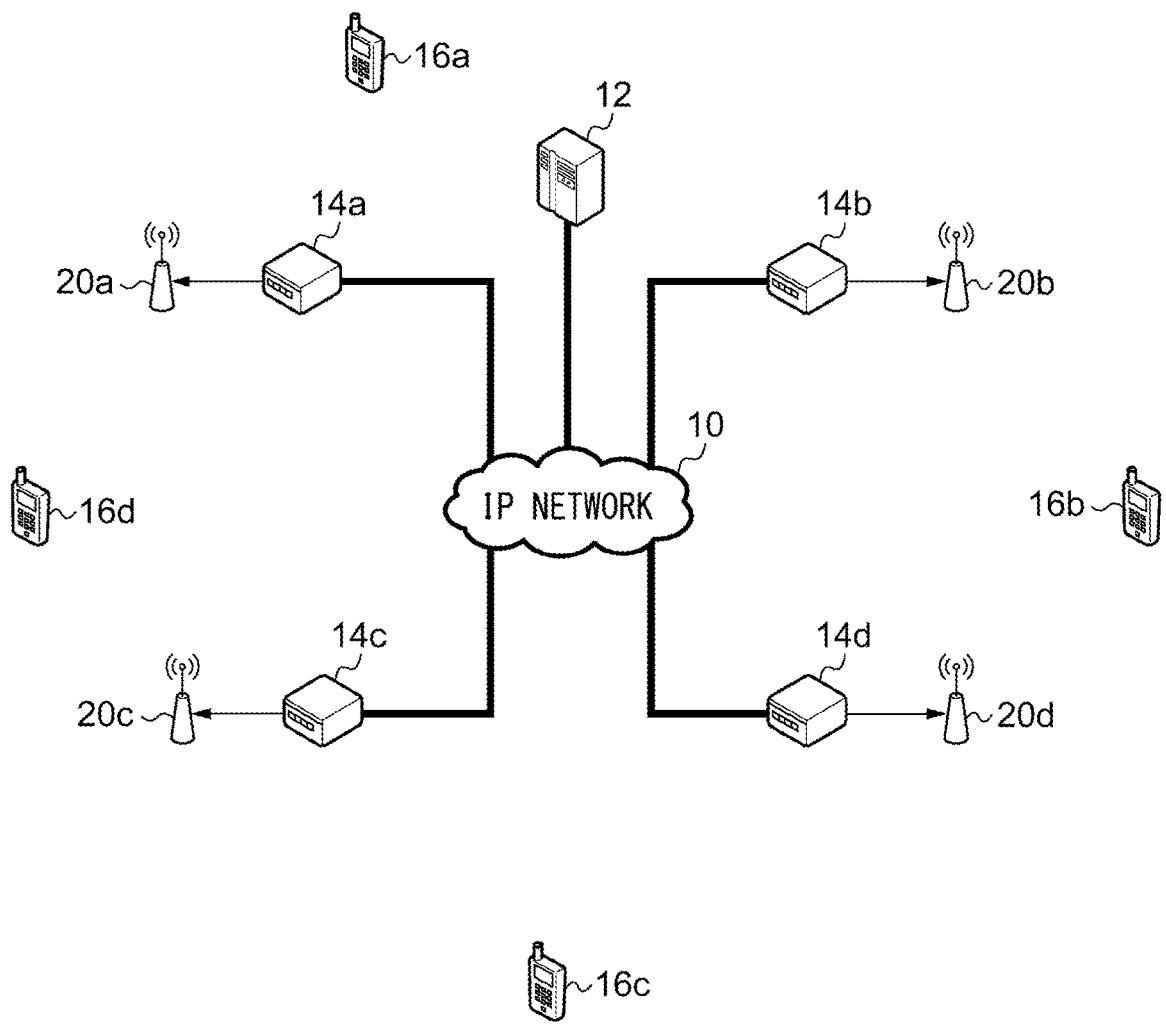
FIG. 17 shows a configuration of the communication system according to embodiment 2.
Figure 18:
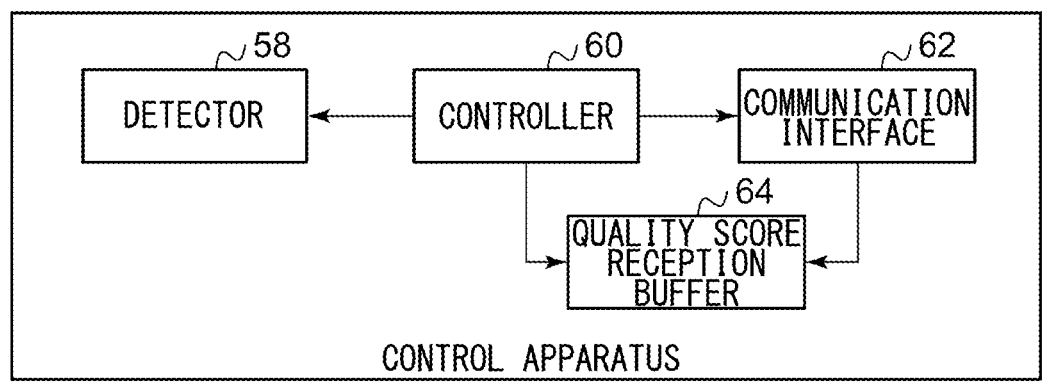
FIG. 18 shows a configuration of the control apparatus of FIG. 17.

FIG. 17 shows a configuration of the communication system 100. In the communication system 100, a control apparatus 12 is added to the features of FIG. 4. The control apparatus 12 may also be referred to as a base station determination apparatus. FIG. 18 shows a configuration of the control apparatus 12. The control apparatus 12 includes a detector 58, a communication interface 62, a quality score reception buffer 64, and a controller 60. The detector 58 performs a process similar to the process of the detector 38 in the base station apparatus 14. The control apparatus 12 is connected to a plurality of base station apparatuses 14 via the IP network 10. When the plurality of base station apparatuses 14 receive call information from the terminal apparatus 16, the base station apparatuses 14 transmit quality score packet signals to the control apparatus 12. The data structure of data stored in the IP address setting interface 36 in one of the plurality of base station apparatuses 14 is as shown in FIG. 19. Instead of the multicast address and port number for transmitting and receiving the quality score packet signal in FIG. 6, the IP address of the control apparatus 12 is stored. The IP address of the control apparatus 12 is set as the destination of the quality score packet signal.

Figure 20:
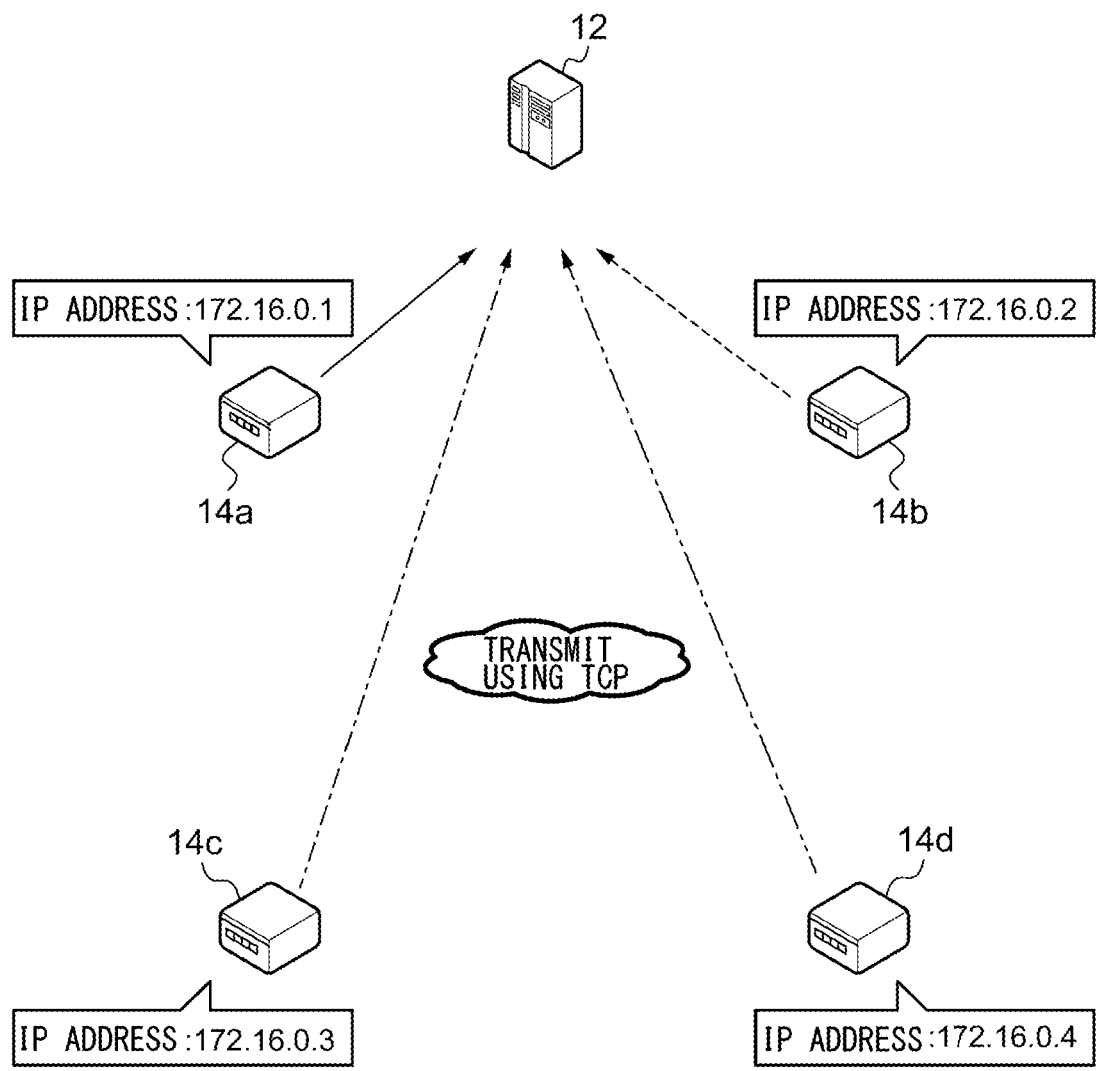
FIG. 20 shows transmission of a quality score packet signal to the control apparatus in the communication system of FIG. 17.

FIG. 20 shows how a quality score packet signal is transmitted to the control apparatus 12 in the communication system 100. The plurality of base station apparatuses 14 transmit quality score packet signals to the control apparatus 12 using the transmission control protocol (TCP) by setting the IP address of the control apparatus 12 shown in FIG. 19. Thus, TCP is used as the transport protocol for connection to the control apparatus 12. TCP is a connection protocol and so ensures that the quality score packet signal transmitted by the base station apparatus 14 is properly received by the control apparatus 12.

Figure 21:
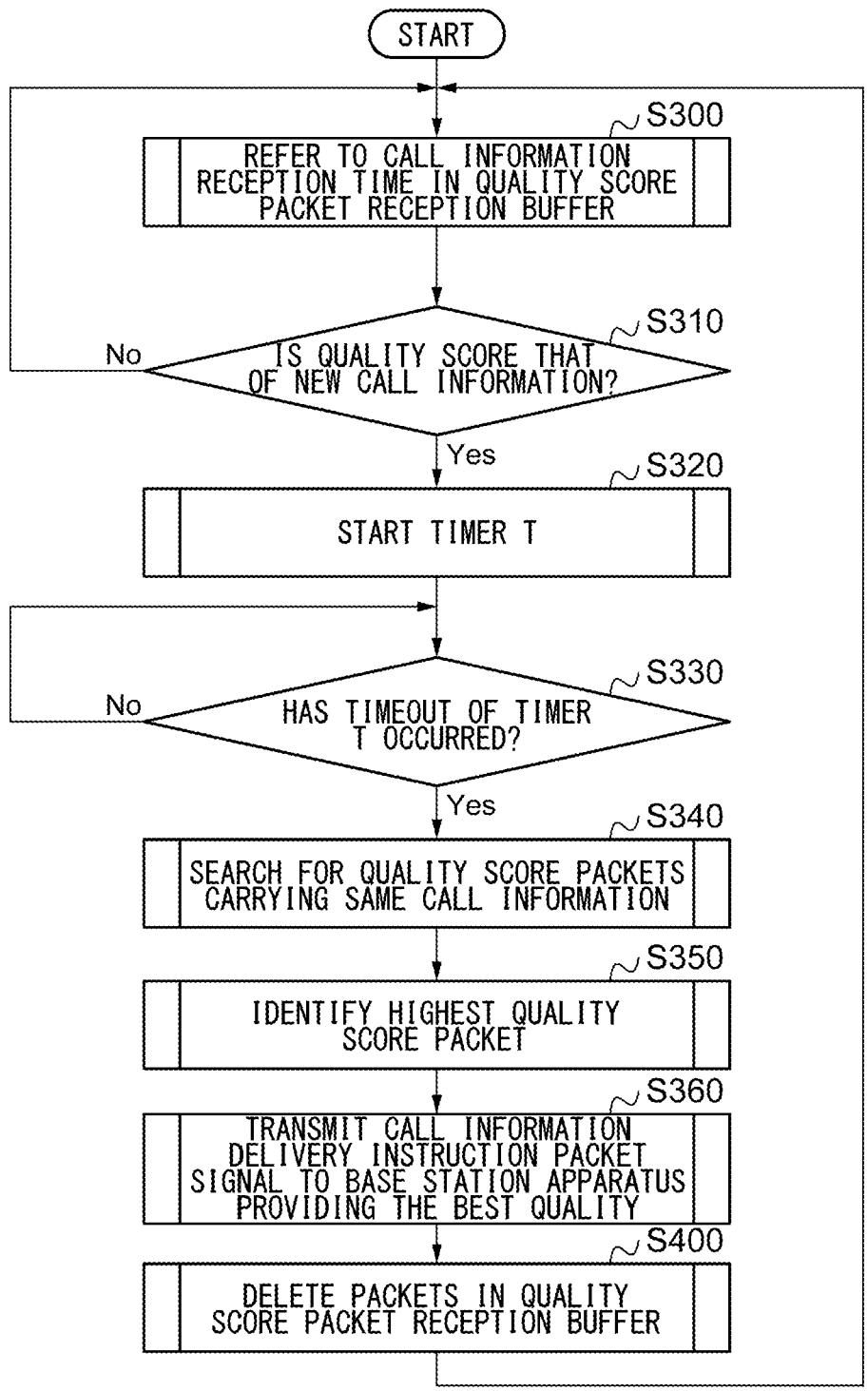
FIG. 21 is a flowchart showing processing steps performed by the control apparatus of FIG. 17.

Hereinafter, the process in the control apparatus 12 will be described by using the flowchart of FIG. 21. FIG. 21 is a flowchart showing processing steps performed by the control apparatus 12. As described above, the control apparatus 12 is provided with the quality score reception buffer 64 and performs steps from S300 to S340. The steps from S300 to S340 are similar to S100 to S140 of FIG. 11, respectively. The communication interface 62 of the control apparatus 12 acquires the identification information (identifier) for identifying the base station apparatus 14, the call information transmission time, and the quality score from each of the plurality of base station apparatuses 14. The IP address of the base station apparatus 14 transmitting the quality score packet signal may be used as the identifier. The quality score reception buffer 64 of the control apparatus 12 stores data in the same format as the data in the quality score reception buffer 44 of the base station apparatus 14.

In S350, the controller 60 of the control apparatus 12 identifies the quality score packet signal with the highest (best) quality score from among the quality scores corresponding to the call information reception time. In other words, the highest quality score packet signal is identified from one or more quality score packet signals recognized as carrying the same call information. Further, the controller 60 acquires the identifier of the base station apparatus 14 transmitting the identified quality score packet signal. In the case there are a plurality of highest quality score packet signals, one identifier is selected and acquired according to a predetermined rule. For example, the IP address may be used as the identifier, and one IP address may be acquired by prioritizing the IP address with a smaller number.

Next, in S360, the communication interface 62 transmits a call information delivery instruction packet signal to the base station apparatus 14 having the identifier acquired in S350. In other words, the communication interface 62 outputs an instruction to direct the one base station apparatus 14 having the identifier corresponding to the identified quality score to transmit the call information corresponding to the identified quality score.

FIG. 22 shows a data structure of a call information delivery instruction packet signal transmitted from the control apparatus 12. The transmission time is set to the time past the call information reception time of the packet signal by a third predetermined period of time. The third predetermined period of time is adjusted according to the circuit speed of the IP network 10, etc. For example, 150 milliseconds is used as the third predetermined period of time. The transport protocol used for transmission of the call information delivery instruction packet signal is also TCP. Reference is made back to FIG. 21. The step of S400 is similar to S230 of FIG. 11, although the steps are performed by different entities. The controller 60 deletes unnecessary quality score packet signals in the quality score reception buffer 64. For example, packet signals for which a predetermined period of time (e.g., 10 minutes or longer) has passed since the reception may be deleted. Control is returned from S400 to S300, whereupon the step is repeated.

Referring to FIG. 17, the base station apparatus 14 receiving the call information delivery instruction packet signal from the control apparatus 12 stores the call information delivery instruction packet signal in a call information delivery instruction packet reception buffer (not shown). The controller 40 of the base station apparatus 14 acquires the transmission time and the call information reception time in the call information delivery instruction packet signal. The controller 40 refers to the call information reception buffer 32 and identifies the call information data received at the same point of time as the call information reception time in the call information delivery instruction packet signal. The controller 40 communicates the transmission time in the call information delivery instruction packet signal and the identified call information data to the communication interface 42. Thereafter, the controller 40 deletes the transmitted call information delivery instruction packet signal in the call information delivery instruction packet reception buffer.

The communication interface 42 packetizes the transmission time and the call information data thus communicated into (to create) a call information packet signal. The configuration of the call information packet signal is the same as that of FIG. 12. The communication interface 42 transmits the call information packet signal thus created to the call information packet transmission and reception multicast address written in the IP address setting interface 36. The subsequent steps are similar to those of embodiment 1. The base station apparatus 14 receiving the call information packet signal at the call information packet signal transmission and reception multicast address transmits the call information at the designated transmission time. The communication system 100 may be operated such that, in the event that a problem with UDP transfer occurs in the IP network 10 when the system is operated in the scheme of embodiment 1, the control apparatus 12 is added to use embodiment 2.

The control apparatus 12 described above is implemented in hardware such as a CPU, a memory, or other LSI's of an arbitrary computer, and in software such as a program loaded into a memory, etc. The figure depicts functional blocks implemented by the coordination of these elements. Therefore, it will be understood by those skilled in the art that the functional blocks may be implemented in a variety of manners by hardware only or by a combination of hardware and software. The functional blocks may be implemented as a program for performing a distributed process by using a plurality of computers. For example, a plurality of computers may be caused to process different functions so that the functions of the control apparatus 12 are implemented by the plurality of computers.

According to the embodiment, the base station transmitting the quality information with the highest quality is directed to transmit the call information packet signal, based on the quality score received from the plurality of base station apparatuses. It is therefore ensured that the call information packet signal is transmitted from only one base station apparatus. Since the call information packet signal is transmitted from only one base station apparatus, the number of call information packet signals, which require a large volume of data to be transmitted and received over the IP network, is reduced. Also, since the number of call information packet signals is reduced, the traffic over the IP network is inhibited from increasing. In other words, the network traffic is inhibited from increasing in a communication system in which the process is performed based on a plurality of signals respectively received in a plurality of base station apparatuses. Since the quality score is received from each of the plurality of base station apparatuses by using TCP, it is guaranteed that the quality score is transferred. Since TCP is used in part for communication, situations where quality score packet signals are not received properly are avoided. The call information reception time is acquired from each of the plurality of base station apparatuses and the quality score with the highest quality is identified from among the quality scores corresponding to the call information reception time acquired. Therefore, the quality scores corresponding to the same call information are compared.

Described above is an explanation based on an exemplary embodiment. The embodiment is intended to be illustrative only and it will be understood by those skilled in the art that various modifications to constituting elements and processes could be developed and that such modifications are also within the scope of the present invention.

In embodiments 1 and 2, a comparison process is performed by using one type of quality score. Alternatively, a plurality of types of quality score may be used in a comparison process. For example, three types of quality score may be calculated according to the first through third methods for calculating the quality score, and the three types of quality score are organized in the order of priority. The order of priority is set such that the first method (method using RSSI) is the highest, the second method (method using information related to errors) is the second highest, and the third method (method using call information data) is the lowest. When the steps of S170, S180 are performed in the base station apparatus 14, the plurality of types of quality score are compared in accordance with the order of priority. First, the quality scores according to the first method with the highest order of priority are compared. When the quality score of the host base station apparatus 14 (the first quality information with the first order of priority) is higher than the quality score of the other base station apparatuses 14 (the second quality information with the first order of priority), the comparison process is terminated. When the first quality information with the first order of priority and the second quality information with the first order of priority have the same value, the quality score with the second order of priority is used to perform the comparison process. When the first quality information with the second order of priority is higher than the second quality information with the second order of priority, the comparison process is terminated. When the first quality information with the second order of priority has the same value as the second quality information with the second order of priority, the quality score with the third order of priority is used to perform the comparison process similarly. A plurality of types of quality score may be used similarly to perform the comparison process of S350 in the control apparatus 12.

According to embodiments 1 and 2, one quality score is selected by using the information for identifying the base station apparatus 14 in the steps of S170, S180, S350, etc., in the case a plurality quality scores subject to comparison have the same value. Alternatively, other methods may be used. For example, the number of times that each base station apparatus 14 transmitted the call information packet signal of S220 is counted over a predetermined period of time in the past. The count may be aggregated in the respective base station apparatuses 14. Alternatively, one base station apparatus 14 may aggregate the counts and deliver the counts to the other base station apparatuses 14. One quality score is then selected from among a plurality of quality scores having the same value, based on the number of times that call information packet signals were transmitted in the past. For example, the quality score of the base station apparatus 14 for which the number of times that the base station apparatus 14 transmitted call information packet signals in the past is large is selected preferentially. Conversely, the quality score of the base station apparatus 14 for which the number of times that the base station apparatus 14 transmitted call information packet signals in the past is small may be selected preferentially.

In embodiments 1 and 2, the call information packet signal may further include the quality score. As described with reference to FIG. 15, when a quality score packet signal goes undelivered due to a temporary network failure or the like in embodiment 1, a plurality of call information packet signals may be transmitted to carry same call information. When the base station apparatus 14 receives a plurality of call information packet signals for which the difference between the transmission time is within a predetermined range, the base station apparatus 14 may compare the quality scores included in the signals, identify one call information packet signal having the highest quality, and wirelessly transmit only the call information corresponding to the identified signal, thereby reducing the likelihood of radio interference.

According to embodiments 1, 2, the business wireless system is used in the communication system 100. Alternatively, a wireless communication system other than the business wireless system, such as a cellular phone system, may be used. According to this variation, the flexibility of the system is improved.

In embodiments 1 and 2, speech communication is performed in the communication system 100, and the call information includes speech data. Alternatively, the communication system may perform data communication for exchanging text data, image data, video data, and other types of data as well as performing speech communication.

In embodiments 1 and 2, the communication system is exemplified by one that uses the IP network 10. Alternatively, networks that use other protocols may be used instead of the IP network 10. According to this variation, the flexibility of the system is improved.

In embodiment 1, the base station apparatus 14 multicasts the quality score packet signal and the call information packet signal. Alternatively, the base station apparatus 14 may deliver the signals in the unicast scheme to the other base station apparatuses 14. In this process, the quality score of the host base station apparatus 14 may not be transmitted to the host base station apparatus 14 and may be stored in a storage area different from the quality score reception buffer 44. According to this variation, the flexibility of the system is improved.

In embodiments 1 and 2, the call information reception time is used to determine whether the call information received in the base station apparatus 14 is subject to comparison. Alternatively, the transmission time or the sequence number of the call information may be used, for example. In this process, the terminal apparatus 16 includes the transmission time or the sequence number in the call information. According to this variation, the flexibility of the system is improved.

What is claimed is:

1. A base station apparatus comprising:
a calculator that calculates first quality information indicating a degree of quality of a signal received from a terminal apparatus;
an acquisition interface circuit that acquires second quality information indicating a degree of quality of a signal received by another base station apparatus from the terminal apparatus;
a determination interface circuit that compares the first quality information calculated by the calculator and the second quality information acquired by the acquisition interface circuit and determines which indicates a higher quality; and
a transmitter that transmits the signal received from the terminal apparatus when it is determined by the determination interface circuit that the quality of the first quality information is higher;

a storage that stores the signal received from the terminal apparatus and the first identification information capable of identifying the signal, wherein the calculator calculates the first quality information of the signal stored in the storage, the acquisition interface circuit also acquires second identification information capable of identifying the signal received by the other base station apparatus from the terminal apparatus, and when the first identification information stored in the storage and the second identification information acquired by the acquisition interface circuit correspond to each other, the determination interface circuit compares the first quality information and the second quality information.

2. The base station apparatus according to claim 1, further comprising:

a notification interface circuit that notifies the other base station apparatus of the first identification information stored in the storage and the first quality information calculated by the calculator.

3. The base station apparatus according to claim 1, wherein when the acquisition interface circuit acquires a plurality of items of the second quality information from a plurality of other base station apparatuses, respectively, the determination interface circuit compares quality information with the highest quality from among the plurality of items of the second quality information with the first quality information.

4. The base station apparatus according to claim 1, wherein the calculator calculates the first quality information based on at least one of an intensity of the signal received from the terminal apparatus, a degree of an error occurring when the signal is received from the terminal apparatus, and noise included in speech data.

5. A base station apparatus comprising:

a calculator that calculates first quality information indicating a degree of quality of a signal received from a terminal apparatus;

an acquisition interface circuit that acquires second quality information indicating a degree of quality of a signal received by another base station apparatus from the terminal apparatus;

a determination interface circuit that compares the first quality information calculated by the calculator and the second quality information acquired by the acquisition interface circuit and determines which indicates a higher quality; and a transmitter that transmits the signal received from the terminal apparatus when it is determined by the determination interface circuit that the quality of the first quality information is higher;

wherein when the first quality information and the second quality information indicate the same quality, the determination interface circuit compares an identifier identifying the base station apparatus hosting the determination interface circuit with an identifier identifying the other base station apparatus corresponding to the second quality information, and, determines whether to direct the transmitter to transmit the signal received from the terminal apparatus in accordance with a result of comparison.

6. A control apparatus comprising:

an acquisition interface circuit that acquires, from a plurality of base station apparatuses, an identifier that identifies each base station apparatus and quality information indicating a degree of quality of a signal received by each base station apparatus from a terminal apparatus;

a selection interface circuit that selects the quality information indicating the highest quality from among the quality information acquired by the acquisition interface circuit; and an output interface circuit that outputs an instruction to direct the base station apparatus having an identifier corresponding to the quality information selected by the selection interface circuit to transmit a signal corresponding to the quality information, wherein when the selection interface circuit detects that there are a plurality of items of quality information with the highest quality, the selection interface circuit selects one item of quality information by using identifiers of the base station apparatuses corresponding to the plurality of items of quality information, respectively.

* * * * *